(12) United States Patent
Mitra et al.

(10) Patent No.: US 10,394,854 B2
(45) Date of Patent: *Aug. 27, 2019

(54) INFERRING ENTITY ATTRIBUTE VALUES

(71) Applicant: MICROSOFT TECHNOLOGY LICENSING, LLC, Redmond, WA (US)

(72) Inventors: Bhaskar Mitra, Redmond, WA (US); Elbio Renato Abib, Redmond, WA (US); Fabio Eigi Imada, Redmond, WA (US); Yu Jiao, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/292,024

(22) Filed: Oct. 12, 2016

(65) Prior Publication Data

US 2017/0032023 A1    Feb. 2, 2017

Related U.S. Application Data

(63) Continuation of application No. 13/920,773, filed on Jun. 18, 2013, now Pat. No. 9,501,503.

(60) Provisional application No. 61/821,550, filed on May 9, 2013.

(51) Int. Cl.
*G06F 16/00* (2019.01)
*G06F 16/28* (2019.01)
(Continued)

(52) U.S. Cl.
CPC .......... *G06F 16/288* (2019.01); *G06F 16/21* (2019.01); *G06F 16/248* (2019.01);
(Continued)

(58) Field of Classification Search
CPC .......... G06F 17/30873; G06F 17/3053; G06F 17/30595; G06F 17/30864;
(Continued)

(56) References Cited

U.S. PATENT DOCUMENTS 7,308,689 B2    12/2007    Black et al.
8,280,918 B2    10/2012    Craswell et al.
(Continued)

FOREIGN PATENT DOCUMENTS

CN      102282555 A    12/2011
CN      103064954 A    4/2013
(Continued)

OTHER PUBLICATIONS

Mayfield et al., "ERACER", proceedings of the 2010 International Conference on Management of Data, SIGMOD '10, Jan. 1, 2010, pp. 75-85.*

(Continued)

*Primary Examiner* — Monica M Pyo
(74) *Attorney, Agent, or Firm* — Shook, Hardy & Bacon LLP (57) ABSTRACT

Systems, methods, and computer-readable storage media are provided for inferring missing or ambiguous attribute values for entities based on partial information about such entities and/or information about other similar entities as extracted from multiple information sources for generating Web ranking signals for online search. A plurality of heterogeneous input data sources are ingested and combined to produce output data having information content that is more than the sum of its parts. A generic platform is provided where multiple data sources having information content related to entity attributes can be plugged-in without additional changes being necessary to the platform. This generic plugin model for extracting and inferring entity attribute values makes it easy to leverage new data sources as they become available to improve the final inferred attribute data.

20 Claims, 7 Drawing Sheets

(51) Int. Cl.
  *G06F 16/21*   (2019.01)
  *G06F 16/248*  (2019.01)
  *G06F 16/901*  (2019.01)
  *G06F 16/2457* (2019.01)
  *G06N 5/04*    (2006.01)

(52) U.S. Cl.
  CPC .... *G06F 16/24578* (2019.01); *G06F 16/9024* (2019.01); *G06N 5/041* (2013.01)

(58) Field of Classification Search
  CPC ......... G06F 17/30398; G06F 17/30536; G06F 17/30554; G06F 17/30598; G06F 17/30607; G06F 16/288; G06F 16/21; G06F 16/24578; G06F 16/248; G06F 16/9024; G06N 5/041
  USPC ................... 707/736, 748, 749, 750; 706/55
  See application file for complete search history.

(56) References Cited

U.S. PATENT DOCUMENTS

| | | | |
|---|---|---|---|
| 8,589,392 B2 | 11/2013 | Topatan et al. | |
| 9,443,021 B2 | 9/2016 | Chandra et al. | |
| 2003/0046099 A1* | 3/2003 | Lamont | G06Q 30/0278 705/36 R |
| 2005/0256832 A1* | 11/2005 | Zhang | G06F 17/30882 |
| 2008/0313119 A1 | 12/2008 | Leskovec et al. | |
| 2010/0306166 A1* | 12/2010 | Pantel | G06N 5/041 706/55 |
| 2012/0215791 A1 | 8/2012 | Malik et al. | |
| 2012/0229466 A1 | 9/2012 | Riche et al. | |
| 2012/0317088 A1* | 12/2012 | Pantel | G06F 17/30893 707/706 |
| 2012/0323558 A1 | 12/2012 | Nolan et al. | |
| 2013/0018900 A1 | 1/2013 | Cheng et al. | |
| 2013/0024449 A1 | 1/2013 | Chatterji et al. | |

FOREIGN PATENT DOCUMENTS

| | | |
|---|---|---|
| EP | 1841178 A1 | 10/2007 |
| WO | 2001075664 A1 | 10/2001 |
| WO | 2012115965 A1 | 8/2012 |

OTHER PUBLICATIONS

Alipanah et al., "Ranking Ontologies Using Verified Entities to Facilitate Federated Queries", 2010 IEEE/WIC/ACM International Conference on Web Intelligence and Intelligent Agent Technology, 6 pages.*

Ruiz et al., "A Java Tool for the Management of Chemical Databases and Similarity Analysis Based on Molecular Graphs Isomorphism", In Book—Computational Science: Lecture Notes in Computer Science, vol. 5102, Jun. 23, 2008, pp. 369-378.

Zhou, et al., "Graph Clustering Based on Structural/Attribute Similarities", In Proceedings of the VLDB Endowment, vol. 2, Issue 1, Aug. 1, 2009, pp. 718-729.

Mayfield, et al., "ERACER: A Database Approach for Statistical Inference and Data Cleaning", In Proceedings of the 2010 International Conference of Management of Data, Jun. 6, 2010, pp. 75-86.

Xu et al.; Non-Patent Literature "Improving Quality of Training Data for Learning to Rank Using Click-Thorugh Data"; WSDM 10. Feb. 4-6, 2010, 10 pages.

"International Preliminary Report on Patentability Issued in PCT Application No. PCT/US2014/037226", dated Sep. 15, 2015, 7 Pages.

Second Written Opinion of the International Preliminary Examining Authority dated Apr. 10, 2015 in Application No. PCT/US2014/037226, 6 pages.

"International Search Report and Written Opinion Issued in PCT Patent Application No. PCT/US2014/037226", dated Dec. 11, 2014, 10 Pages.

"Office Action Issued in European Patent Application No. 14728059.8", dated Jan. 24, 2017, 7 pages.

"First Office Action and Search Report Issued in Chinese Patent Application No. 201480026225.2", dated Mar. 14, 2017, 11 pages.

"Notice of Allowance Issued in U.S. Appl. No. 13/920,773", dated Jul. 26, 2016, 14 pages.

"Non-Final Office Action Issued in U.S. Appl. No. 13/920,773", dated Jun. 19, 2015, 14 pages.

"Non-Final Office Action Issued in U.S. Appl. No. 13/920,773", dated Jan. 5, 2016, 10 pages.

"Second Office Action Issued in Chinese Patent Application No. 201480026225.2", dated Sep. 13, 2017, 14 Pages.

"Office Action Issued in European Patent Application No. 14728059.8", dated Jan. 29, 2019, 5 Pages.

* cited by examiner

INFERRING ENTITY ATTRIBUTE VALUES

CROSS-REFERENCE TO RELATED APPLICATIONS

This application is a continuation of U.S. patent application Ser. No. 13/920,773, filed Jun. 18, 2013, which claims the benefit of U.S. Provisional Patent Application No. 61/821,550, filed May 9, 2013 and entitled "Inferring Entity Attribute Values," whose applications are hereby incorporated by reference as if set forth in its entirety herein.

BACKGROUND

In recent years many online search features have begun to pivot around entities. Entities are instances of abstract concepts and objects, including people, events, locations, businesses, movies, and the like. Entities generally include one or more attributes, each attribute having at least one associated attribute value. Some search engines, for instance, the BING search engine available from Microsoft Corporation of Redmond, Wash., are capable of powering scenarios to explicitly search for a specific entity instead of just a text description of the entity. For example, such a search engine may be capable of recognizing "John Doe" as an entity and thus of providing a richer search result experience for specifically this entity over the search experience it could provide for a textual query such as "john doe."

One key challenge for performing Web ranking for specific known entities is to maintain a database of known attribute values associated with such entities (such as the employer associated with a person entity, the location associated with a restaurant entity, and the like). Some solutions have focused on mining crawled Web content, via the use of templates for example, for creating such databases. Often, however, these databases suffer from missing or ambiguous attribute values that are either not present on the Web or could not be successfully extracted and/or associated with the relevant entity.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In various embodiments, systems, methods, and computer-readable storage media are provided for inferring missing attribute values for entities based on partial information about such entities and/or information about other similar entities as extracted from multiple information sources for generating Web ranking signals for online search. Embodiments of the present invention ingest a plurality of heterogeneous input data sources and combine them to produce output data having information content that is more than the sum of its parts. In so doing, conflating partial information about entities from different sources and inferring attribute values based on related entities are addressed as a single problem.

Embodiments of the present invention provide a generic platform where multiple data sources having information content related to entity attributes can be plugged-in without any additional changes being necessary to the platform. This generic plugin model for extracting and inferring entity attribute values is a strength for the platform as it makes it easy to leverage new data sources as they become available to improve the final inferred attribute data.

BRIEF DESCRIPTION OF THE DRAWINGS

The present invention is illustrated by way of example and not limitation in the accompanying figures in which like reference numerals indicate similar elements and in which.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-readable storage media for inferring missing or ambiguous attribute values for entities based on partial information about such entities and/or information about other similar entities as extracted from multiple information sources for generating Web ranking signals for online search. Embodiments of the present invention ingest a plurality of heterogeneous input data sources and combine them to produce output data having information content that is more than the sum of its parts. To do this there are two broad problems that need to be addressed.

In accordance with embodiments hereof, all of the information about a single entity from a single data source is treated as a unit of information referred to herein as a "partial." Thus, a partial is effectively all of the information that a particular data source has related to a specific entity. Partials from multiple data sources are utilized to create a partial-to-partial similarity graph based on overlap of attributes and other graph based similarity measures. It is expected that two partials corresponding to the same entity from two different data sources will have a very high similarity score followed by partials that are not for the same exact entity but share a lot of common attributes (for example, partials corresponding to two different people entities who have the same employer and current location will most likely have a high similarity score). Possible values for missing attributes are then inferred for a given partial by examining the attribute values of a large number of related partials (corresponding to the same entity or otherwise) from the partial-to-partial similarity graph.

For instance, suppose that the residence location of a particular person entity is unknown but it is known that the person's job title is "Software Engineer" and his employer is "Microsoft Corporation." Based on the other entities with the same attribute values it can be inferred that the individual's residence location has a high chance of being Redmond, Wash. (or near Seattle, Wash.), followed by other geographic locations where Microsoft Corporation has a strong presence (such as Silicon Valley, Beijing, Hyderabad, and the like) with varying degrees of confidence. As another example, suppose that the price of a particular product entity is unknown but it is known that the product has a particular category classification provided by the data source. Based upon the price of other products having the same or a similar category classification, the price of the particular product can be roughly estimated or inferred. Such inferred attribute values may also be utilized as ranking signals, for instance, for queries where the user has a clear preference for a specific price range (e.g., for a query like "cheap DSLR camera").

Accordingly, one embodiment of the present invention is directed to one or more computer-readable storage media storing computer-useable instructions that, when used by one or more computing devices, cause the one or more computing devices to perform a method for inferring entity attribute values. The method comprises receiving data from multiple heterogeneous data sources, the data including a plurality of entity attribute values each associated with an entity and an attribute, each attribute having an associated attribute type and an attribute confidence score. The method further comprises creating a partial-to-attribute graph that includes the plurality of entity attribute values and associated entities, wherein a partial is a set of attributes and their corresponding attribute values for a particular entity. Still further, the method comprises creating a partial-to-partial similarity graph based upon attribute overlap in the partial-to-attribute graph; identifying a specific partial corresponding to a first entity in the partial-to-partial similarity graph, the specific partial including a missing or ambiguous attribute for the first entity; identifying one or more spatially proximate partials to the specific partial from the partial-to-partial similarity graph; and inferring a possible value for the missing or ambiguous attribute for the first entity by identifying, in aggregate across the one or more spatially proximate partials, values associated with the missing or ambiguous attribute.

In another embodiment, the present invention is directed to a method being performed by one or more computing devices including at least one processor, the method for inferring entity attribute values. The method comprises receiving data from multiple heterogeneous data sources, the data including a plurality of entity attribute values each associated with an entity and an attribute, the attribute having an associated attribute type and an attribute confidence score; normalizing the plurality of entity attribute values across the data received from the multiple heterogeneous data sources; computing an authority score for each of the multiple heterogeneous data sources based upon comparisons with a truth set of data on a per attribute-type basis; normalizing the attribute confidence scores associated with each attribute; scaling the normalized attribute confidence scores; and aggregating the data across the multiple heterogeneous data sources. The method further comprises creating a partial-to-attribute graph that includes the plurality of entity attribute values and associated entities, wherein a partial is a set of attributes and their corresponding attribute values for a particular entity; creating a partial-to-partial similarity graph based upon attribute overlap in the partial-to-attribute graph; identifying a specific partial corresponding to a first entity in the partial-to-partial similarity graph, the specific partial including a missing or ambiguous attribute for the first entity; identifying one or more spatially proximate partials to the specific partial from the partial-to-partial similarity graph; and inferring a possible value for the missing or ambiguous attribute for the first entity by identifying, in aggregate across the one or more spatially proximate partials, values associated with the missing or ambiguous attribute. In embodiments, the possible value for the missing or ambiguous attribute for the first entity is a ranked set of possible values for the missing or ambiguous attribute for the first entity based on confidence scores.

In yet another embodiment, the present invention is directed to a system including an inference engine having one or more processors and one or more computer-readable storage media and a data store coupled with the inference engine. The inference engine is configured to receive data from multiple heterogeneous data sources, the data including a plurality of entity attribute values each associated with an entity and an attribute, the attribute having an associated attribute type and an attribute confidence score; create a partial-to-attribute graph that includes the plurality of entity attribute values and associated entities, wherein a partial is a set of attributes and their corresponding attribute values for a particular entity; create a partial-to-partial similarity graph based upon attribute overlap in the partial-to-attribute graph; identify a specific partial corresponding to a first entity in the partial-to-partial similarity graph, the specific partial including a missing or ambiguous attribute for the first entity; identify one or more spatially proximate partials to the specific partial from the partial-to-partial similarity graph; and infer a possible value for the missing or ambiguous attribute for the first entity by identifying, in aggregate across the one or more spatially proximate partials, values associated with the missing or ambiguous attribute.

Having briefly described an overview of embodiments of the present invention, an exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one component nor any combination of components illustrated.

Embodiments of the invention may be described in the general context of computer code or machine-useable instructions, including computer-useable or computer-executable instructions such as program modules, being executed by a computer or other machine, such as a personal data assistant or other handheld device. Generally, program modules include routines, programs, objects, components, data structures, and the like, and/or refer to code that performs particular tasks or implements particular abstract data types. Embodiments of the invention may be practiced in a variety of system configurations, including, but not limited to, hand-held devices, consumer electronics, general-purpose computers, more specialty computing devices, and the like. Embodiments of the invention may also be practiced in distributed computing environments where tasks are performed by remote-processing devices that are linked through a communications network.

Figure 1:
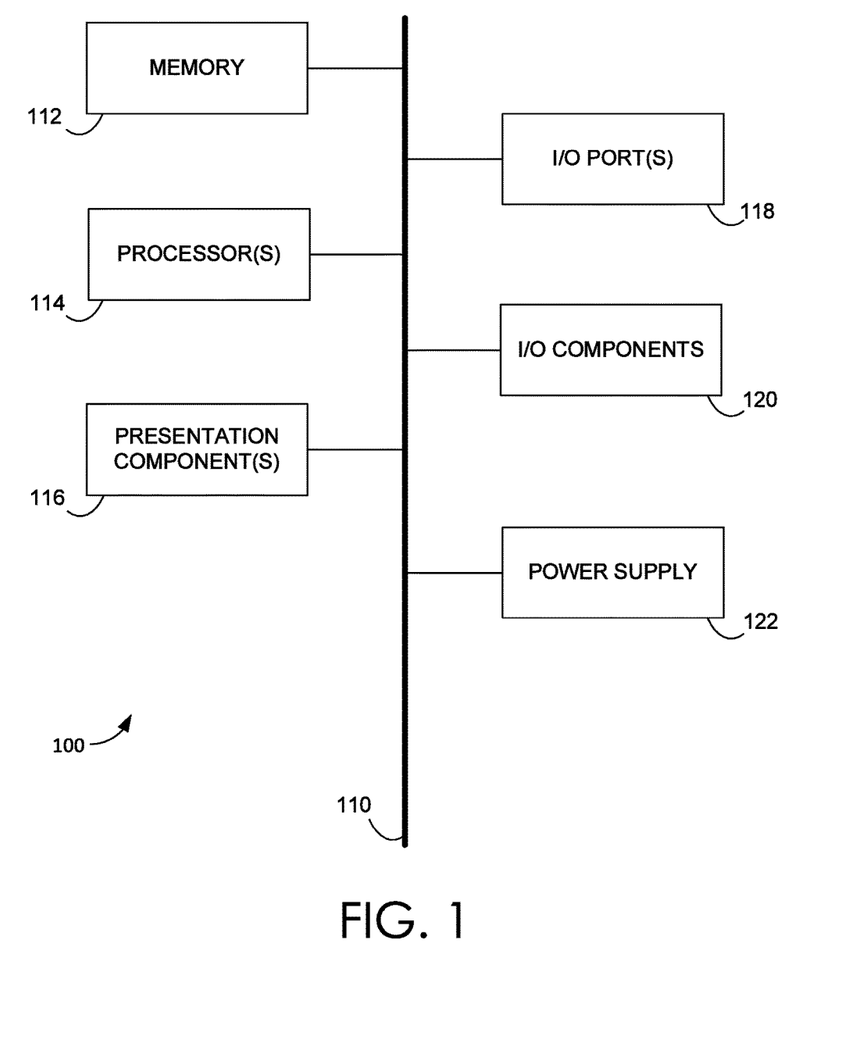
FIG. 1 is a block diagram of an exemplary computing environment suitable for use in implementing embodiments of the present invention.

With continued reference to FIG. 1, the computing device 100 includes a bus 110 that directly or indirectly couples the following devices: a memory 112, one or more processors 114, one or more presentation components 116, one or more input/output (I/O) ports 118, one or more I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media may be any available media that is accessible by the computing device 100 and includes both volatile and nonvolatile media, removable and non-removable media. Computer-readable media comprises computer storage media and communication media; computer storage media excluding signals per se. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative I/O components include a microphone, joystick, game pad, satellite dish, scanner, printer, wireless device, a controller, such as a stylus, a keyboard and a mouse, a natural user interface (NUI), and the like.

A NUI processes air gestures, voice, or other physiological inputs generated by a user. These inputs may be interpreted as search requests, words appearing in documents available for retrieval in response to input search requests, and the like presented by the computing device 100. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as, stereoscopic camera systems, infrared camera systems, RGB camera systems, and combinations of these for gesture detection and recognition. Additionally, the computing device 100 may be equipped with accelerometers or gyroscopes that enable detection of motion. The output of the accelerometers or gyroscopes is provided to the display of the computing device 100 to render immersive augmented reality or virtual reality.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices. The computer-useable instructions form an interface to allow a computer to react according to a source of input. The instructions cooperate with other code segments to initiate a variety of tasks in response to data received in conjunction with the source of the received data.

Furthermore, although the term "inference engine" is used herein, it will be recognized that this term may also encompass servers, Web browsers, sets of one or more processes distributed on one or more computers, one or more stand-alone storage devices, sets of one or more other computing or storage devices, any combination of one or more of the above, and the like.

As previously set forth, embodiments of the present invention provide systems, methods, and computer-readable storage media for inferring missing (or ambiguous) attribute values for entities based on partial information about such entities and/or information about other similar entities as extracted from multiple information sources for generating Web ranking signals for online search. Embodiments of the present invention are implemented as a workflow that ingests data from a plurality of heterogeneous input data sources. A generic way to combine data from each of the plurality of heterogeneous input data sources without requiring any data source specific logic is needed, particularly given how little consistency can be assumed across the different data sources. Some of the data sources will have high overlap in information content with others while some of them can be really unique. This means that not only is a common representation of the data needed, but also a good story around normalization of the attribute values and their corresponding scores so that they are meaningful across data sources.

Figure 2:
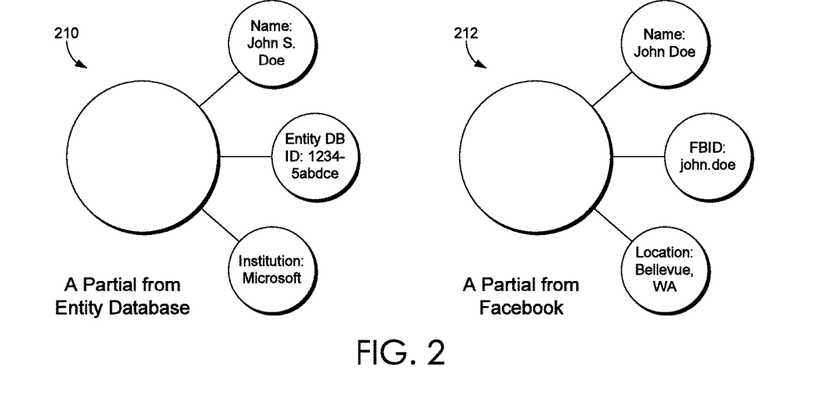
FIG. 2 is a schematic diagram of a partial entity view ("partial") from each of two heterogeneous data sources, in accordance with an embodiment of the present invention.

Embodiments of the present invention utilize the concept of a partial entity view (or simply, a "partial") to provide a common data representation. A partial is a collection of attributes corresponding to an entity available from a single data source which happens to be a subset of all the information available about the same entity in the known universe. Exemplary partials from two different data sources are illustrated in FIG. 2. The first partial 210 illustrates a partial from an entity database and the second partial 212 illustrates a partial, for the same entity, from the FACEBOOK database.

Figure 3:
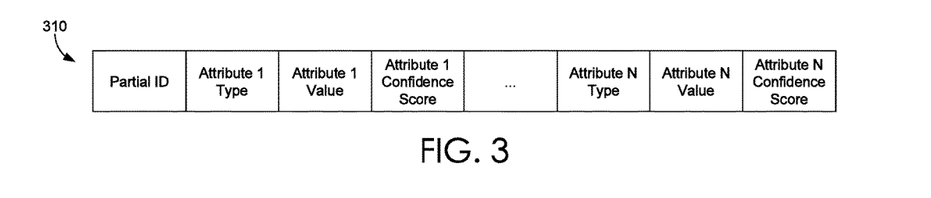
FIG. 3 is a schematic diagram of an exemplary data structure for partials in accordance with embodiments of the present invention.

From a data structure point of view, a partial is simply a collection of attributes where each attribute can be multi-valued and hence each partial conceptually has a common exact format. An exemplary common format is shown in the data structure 300 illustrated in FIG. 3. In accordance with embodiments of the present invention, each individual data source pre-formats and provides data in a standard format which effectively comprises of a list of partials each represented in, for instance, JavaScript Object Notation (JSON).

Once there is a common representation of how each heterogeneous data source is formatted, it is still possible for the data sources to represent the same attribute values in a different way (e.g., {Seattle, USA} vs. {Seattle, Wash., USA}). As such, the attribute values need to be normalized such that they can be meaningfully compared across data sources. In embodiments, a highly normalized representation for each attribute is generated that is referred to herein as a "match key." The match key is used internally for comparing attribute values. As will be appreciated by those of ordinary skill in the art, there are different techniques for creating normalization match keys. In embodiments, match keys may be generated based on the specific attribute types. For instance, for people names, a phonetic (modified Metaphone) hash may be computed; for URLs, a Hut Hash may be computed; for location, entity name normalization may be performed; and for geo-location, the "closest matching" container entity from geo-spatial data may be identified and then entity name normalization performed. Any and all such variations, and any combination thereof are contemplated to be within the scope of embodiments of the present invention and particular normalization techniques are not intended to limit embodiments hereof.

Another kind of normalization that is performed in accordance with embodiments hereof is for the attribute confidence scores. Each data source generally includes its own logic for computing confidence scores and therefore they often are not comparable across data sources. While, again, various normalization techniques may be utilized within the scope of embodiments hereof, one exemplary normalization technique is a simple statistical normalization using stddev/mean for the scores within each data source.

The next challenge is to devise a way to measure (at least approximately) the quality of each data source. If input data sources are noisy and they are not weighed according to quality, then it's easy to end up with a garbage-in-garbage-out scenario (especially if the quality of the different data sources varies wildly when compared with one another). In embodiments, a data source authority score per data source and per attribute type is computed by comparing the precision of the specific data source with a truth data set as a baseline. In accordance with embodiments hereof, data source authority scores, once computed, are used to scale the normalized attribute confidence scores before they are finally aggregated and fed into the attribute value inference engine, as more fully described below.

At this stage, aggregated data containing partials from each source (normalized and finally merged) is available. What is next needed is an overall strategy for inferring attributes for a specific entity given this aggregated data. In accordance with embodiments of the present invention (and as more fully described below), a partial-to-partial similarity score is computed that is conceptually in this similarity graph context a cluster of partials that loosely define an entity from the real world. It is also likely that there will be connections between partials corresponding to two different but similar entities (e.g., two people entities that both work for Microsoft Corporation and live in Redmond, Wash.). These connections are also important as they can be useful in making "best guesses" for attributes in case there is a lack of reliable information. For example, if one was lacking information about the residence location of a particular people entity but it was known that the individual worked for Microsoft Corporation and was a Software Developer by profession, by examining other entities matching the same known attributes, it would be relatively easy to infer that Redmond, Wash. was a probably residence location for the individual.

Figure 4:
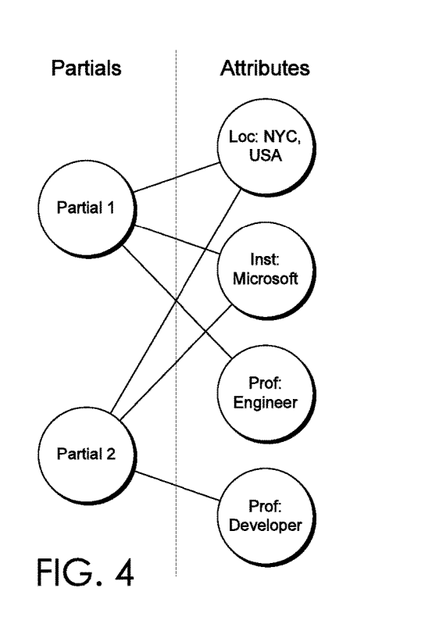
FIG. 4 is a schematic diagram of a partial-attribute graph, in accordance with an embodiment of the present invention.

In accordance with embodiments hereof, the normalized data from across the different input data sources is merged. From this data a partial-to-attribute bi-partite graph is created. (An exemplary partial-to-attribute bi-partite graph is illustrated in the schematic diagram of FIG. 4.) Given the vast amount of information available from the various data sources, this graph can be very large in scale (can be in the range of billions of nodes depending on actual inputs and use cases). As such, in embodiments, the graph connections may be made sparser by removing edges that are less important to generating attribute value inferences (e.g., removing connections between a partial and an attribute). It's important to note that popular attributes generally make weak features. Thus, one option can be to simply drop these popular attributes from the graph. The issue with this approach, however, is that even though these features individually may be weak they often can be combined to create composite features that are strong. For example, NYC as a residence location and Microsoft Corporation as a professional institution together for the same partial can be a very strong feature.

Figure 5:
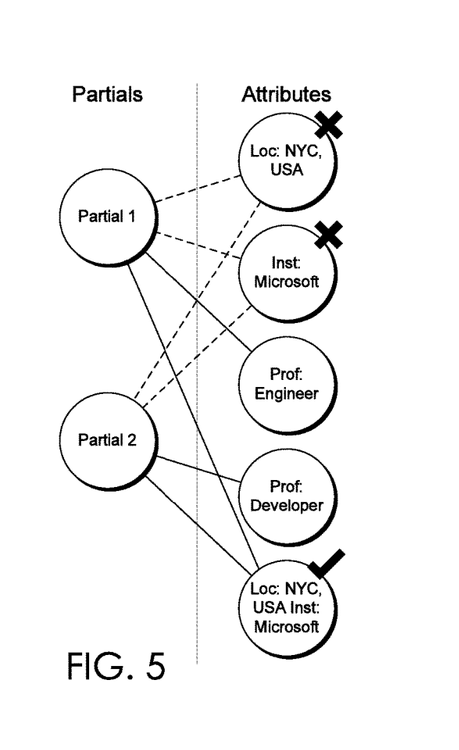
FIG. 5 is a schematic diagram of a partial-attribute graph having a composite attribute, in accordance with an embodiment of the present invention.

To reduce the information loss, composite attributes (pairs or triplets of attribute values, each of a different type) are introduced into the graph. Once these composite attributes have been added it's now much safer to drop the popular attributes from the graph without significant risk of information loss. Thus, very common attribute values (e.g., location=New York) subsequently are removed as they are less important for computing partial-to-partial similarity than rarer attributes (e.g., location=Kodiak islands). A partial-to-attribute graph having a composite attribute, in accordance with an embodiment of the present invention, is illustrated in the schematic diagram of FIG. 5.

Figure 6:
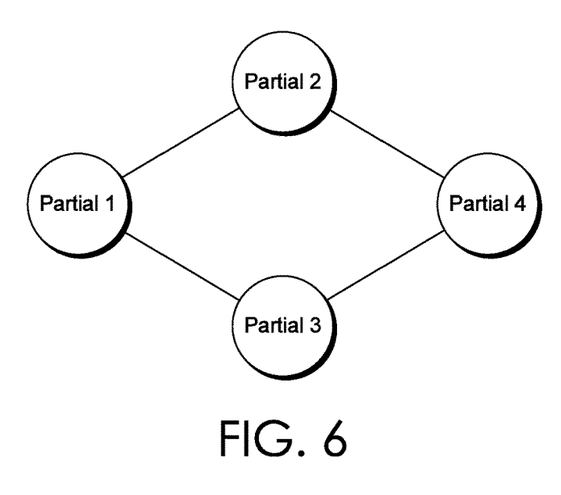
FIG. 6 is a schematic diagram of a partial-partial similarity graph, in accordance with an embodiment of the present invention.

In accordance with embodiments of the present invention, now each partial can be represented by a feature vector corresponding to all the weights on edges connected to a particular partial node. A basic similarity between pairs of partials is computed as a dot product between their corresponding feature vectors. In accordance with embodiments hereof, partial-to-partial similarity then is computed based upon attribute overlap (including composite attributes). The result is a partial-to-partial similarity graph where each node is a partial and each edge weight corresponds to the "similarity" between the two corresponding partials. (An exemplary partial-to-partial similarity graph is shown in the schematic diagram of FIG. 6.) It should be noted that this similarity measure is based on the original attribute overlaps. However, it is easy to see in the schematic diagram of FIG. 6, one should be able to compute a non-zero similarity score between partials (e.g., Partial 1 and Partial 4 of FIG. 6) even though they may not have shared any common attributes to start with.

In embodiments, the edge weights of the partial-to-partial similarity graph are further smoothed by re-computing the partial-to-partial similarity measure based on the current graph structure. This is an iterative process which also aids in discovery of indirect relationships (that is, partials that may not have any direct attribute overlap but have a lot of common related partials). The number of iterations directly impacts the distance away from one another two partials can be and still be assigned a similarity score.

Figure 7:
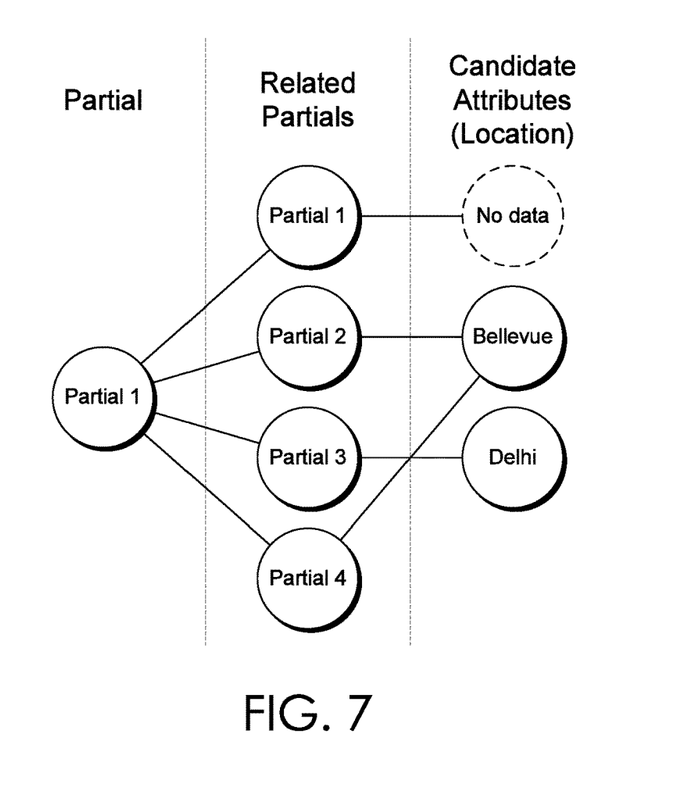
FIG. 7 is a schematic diagram showing a missing or ambiguous attribute for which an inference engine in accordance with embodiments of the present invention may infer values.

To infer missing or ambiguous attribute values for an entity, known partials corresponding to that entity are identified in the partial-to-partial similarity graph. An exemplary partial-to-partial similarity graph having a missing attribute value is illustrated in the schematic diagram of FIG. 7. Neighboring (or spatially proximate) partials to those partials from the same graph are then identified. The attributes are then examined, in aggregate, across these similar/neighboring partials to estimate the possible value of the attribute for the entity of interest. It should be noted that each attribute can be multi-valued and hence in the output for the missing or ambiguous attribute for an entity, a ranked list of possible values based on confidence scores computed from the partial-to-partial similarity graph may be provided.

Once the Partial-Partial similarity graph is created, it may be used along with the original partial-to-attribute graph (just a re-transformation of the original aggregated input data) to rank possible attribute values for a given entity. That is, a confidence score for an attribute value for a given entity may be computed that is a relative number in the context of the same entity and the same attribute type. While it's possible that the score may be meaningful across different entities and attribute types, such is not necessarily the case.

In accordance with embodiments hereof, the following simple function may be utilized to compute the attribute confidence scores for a given partial based on its neighboring or spatially proximate partials.

$$S(P_i, A_k) = \Sigma(C(P_i, P_j) * S(P_j, A_k))$$

In the above equation, $P_i$ and $P_j$ are any two partials and $A_k$ is an attribute. $S(P_i, A_k)$ is the attribute score for $A_k$ for the partial $P_i$. $C(P_i, P_j)$ is the partial-to-partial similarity score between $P_i$ and $P_j$.

Figure 8:
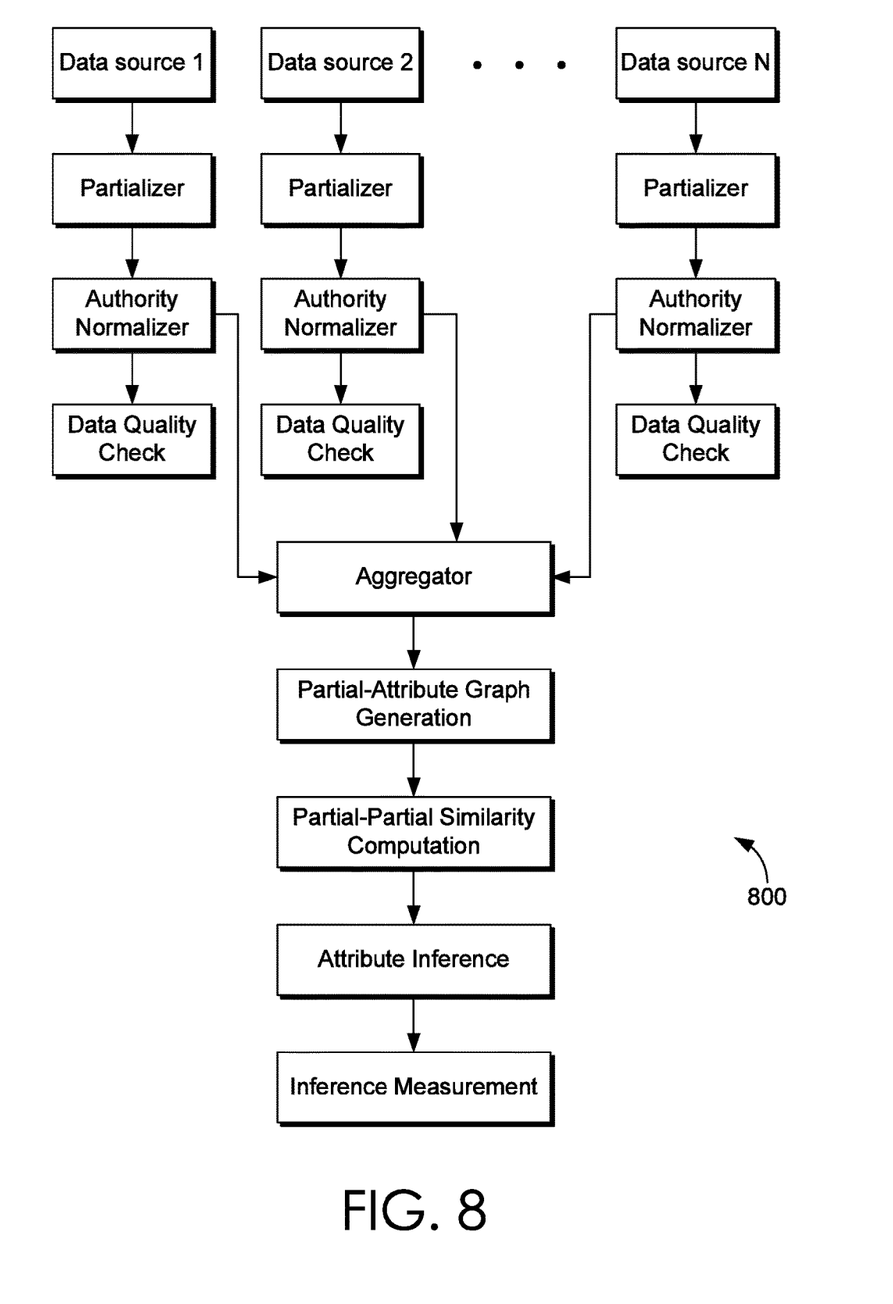
FIG. 8 is a block diagram of an exemplary computing system in which embodiments of the invention may be employed.

Referring now to FIG. 8, a block diagram is provided illustrating an exemplary computing system 800 in which embodiments of the present invention may be employed. Generally, the computing system 800 illustrates an environment in which entity attribute values may be inferred in accordance with the methods, for instance, illustrated in FIGS. 9 and 10 (more fully described below). Among other components not shown, the computing system 800 generally includes a user computing device and an inference engine in communication with one another via a network. The network may include, without limitation, one or more local area networks (LANs) and/or wide area networks (WANs). Such networking environments are commonplace in offices, enterprise-wide computer networks, intranets and the Internet. Accordingly, the network is not further described herein.

It should be understood that any number of user computing devices and/or inference engines may be employed in the computing system 800 within the scope of embodiments of the present invention. Each may comprise a single device/interface or multiple devices/interfaces cooperating in a distributed environment. For instance, the inference engine may comprise multiple devices and/or modules arranged in a distributed environment that collectively provide the functionality of the inference engine described herein. Additionally, other components or modules not shown also may be included within the computing system 800.

In some embodiments, one or more of the illustrated components/modules may be implemented as stand-alone applications. In other embodiments, one or more of the illustrated components/modules may be implemented via the user computing device, the inference engine, or as an Internet-based service. It will be understood by those of ordinary skill in the art that the components/modules illustrated in FIG. 8 are exemplary in nature and in number and should not be construed as limiting. Any number of components/modules may be employed to achieve the desired functionality within the scope of embodiments hereof. Further, components/modules may be located on any number of inference engines and/or user computing devices. By way of example only, the inference engine might be provided as a single computing device, a cluster of computing devices, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown and/or described, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The user computing device may include any type of computing device, such as the computing device 100 described with reference to FIG. 1, for example. Generally, the user computing device includes a browser and a display. The browser, among other things, is configured to render search engine home pages (or other online landing pages) and search engine results pages (SERPs), in association with the display of the user computing device. The browser is further configured to receive user input of requests for various web pages (including search engine home pages), receive user input search queries (generally input via a user interface presented on the display and permitting alpha-numeric and/or textual input into a designated search input region) and to receive content for presentation on the display, for instance, from the inference engine. It should be noted that the functionality described herein as being performed by the browser may be performed by any other application, application software, user interface, or the like capable of rendering Web content. It should further be noted that embodiments of the present invention are equally applicable to mobile computing devices and devices accepting touch and/or voice input. Any and all such variations, and any combination thereof, are contemplated to be within the scope of embodiments of the present invention.

The inference engine of the system 800 of FIG. 8 is configured to, among other things, receive search queries and provide search results in the form of entities in response thereto. As illustrated, the inference engine has access to a plurality of data sources. Each data source is configured to store information related to one or more of search queries, search results, entities and related attributes and/or attribute values. In embodiments, such data sources are configured to be searchable for one or more of the items stored in association therewith. It will be understood and appreciated by those of ordinary skill in the art that the information stored in association with the data sources may be configurable and may include any information relevant to entities, attributes, attribute values, partials, relationships among partials and/or attributes, and the like. The content and volume of such information are not intended to limit the scope of embodiments of the present invention in any way. Further, each data source may be a single, independent component or a plurality of storage devices, for instance a database cluster, portions of which may reside in association with the inference engine, the user computing device, another external computing device, and/or any combination thereof.

Figure 9:
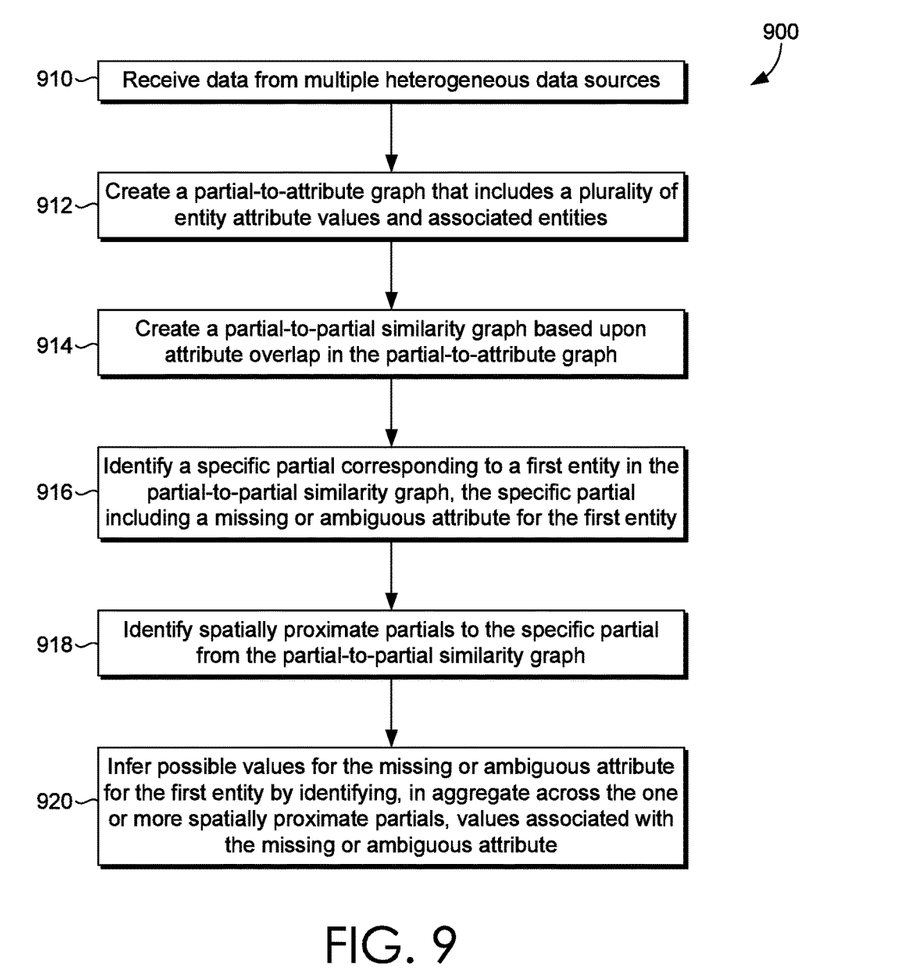
FIG. 9 is a flow diagram showing an exemplary method for inferring entity attribute values, in accordance with an embodiment of the present invention.

Turning now to FIG. 9, a flow diagram is illustrated showing an exemplary method 900 for inferring entity attribute values, in accordance with an embodiment hereof. As indicated at block 910, data from multiple heterogeneous data sources is received. The data includes a plurality of entity attribute values each associated with an entity and an attribute. Each attribute has an associated attribute type and an attribute confidence score. As indicated at block 912, a partial-to-attribute graph is created that includes the plurality of entity attribute values and associated entities, wherein a partial is a set of attributes and their corresponding attribute values for a particular entity. As indicated at block 914, a partial-to-partial similarity graph is created based upon attribute overlap in the partial-to-attribute graph. Subsequently, a specific partial corresponding to a first entity in the partial-to-partial similarity graph is identified, the specific partial including a missing or ambiguous attribute for the first entity. This is indicated at block 916. As indicated at block 918, one or more spatially proximate partials to the specific partial from the partial-to-partial similarity graph is identified. As indicted at block 920, a possible value for the missing or ambiguous attribute for the first entity is inferred by identifying, in aggregate across the one or more spatially proximate partials, values associated with the missing or ambiguous attribute.

Figure 10:
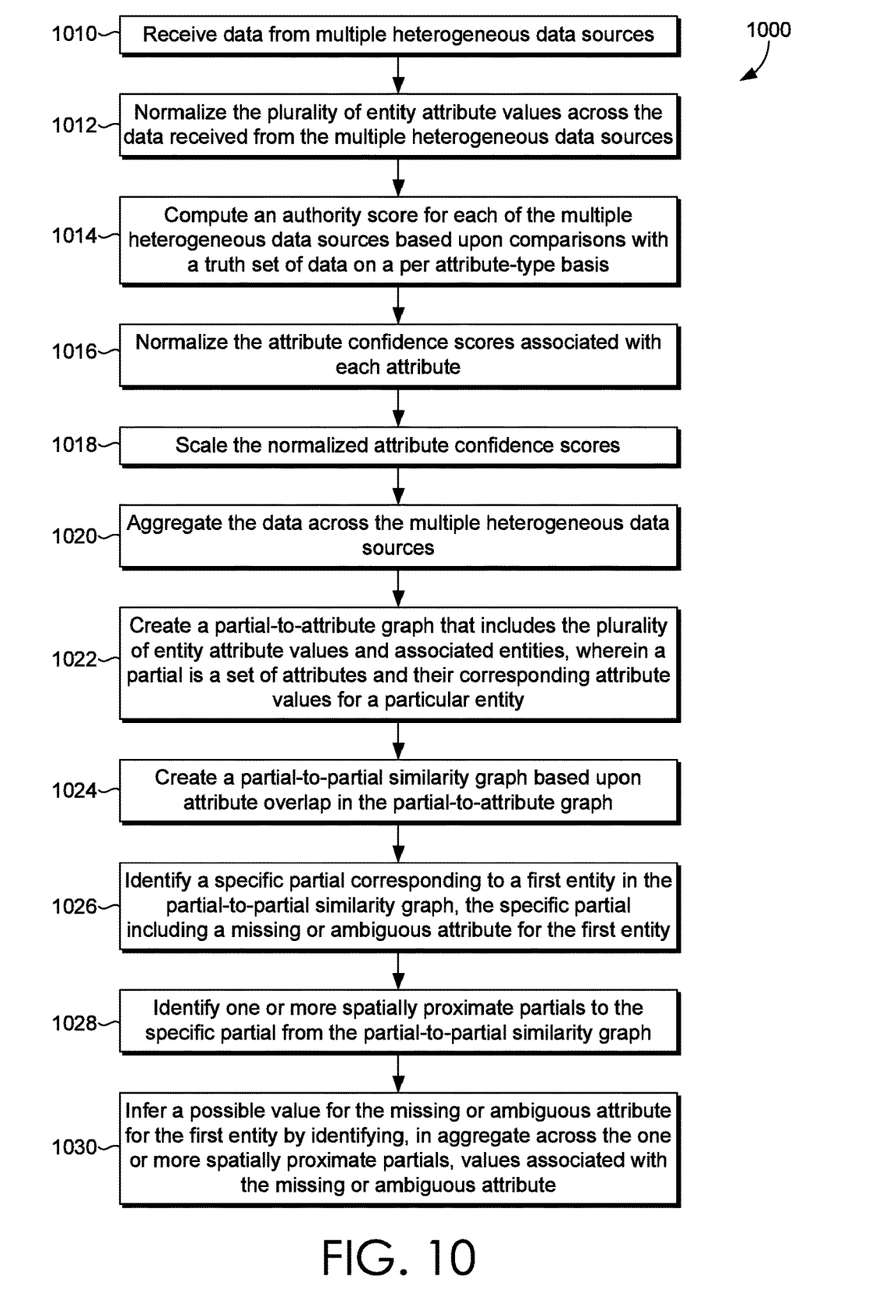
FIG. 10 is a flow diagram showing another exemplary method for inferring entity attribute values, in accordance with an embodiment of the present invention.

With reference now to FIG. 10, a flow diagram is illustrated showing an exemplary method 1000 for inferring entity attribute values, in accordance with an embodiment of the present invention. As indicated at block 1010, data is received from multiple heterogeneous data sources, the data including a plurality of entity attribute values each associated with an entity and an attribute. The attribute includes an associated attribute type and an attribute confidence score. As indicated at block 1012, the plurality of entity attribute values are normalized across the data received from the multiple heterogeneous data sources. As indicated at block 1014, an authority score is computed for each of the multiple heterogeneous data sources based upon comparisons with a truth set of data on a per attribute-type basis. As indicated at block 1016, the attribute confidence scores associated with each attribute are normalized and the normalized attribute confidence scores are scaled, as indicated at block 1018. As indicated at block 1020, the data across the multiple heterogeneous data sources is aggregated and a partial-to-attribute graph is created that includes the plurality of entity attribute values and associated entities. A partial is a set of attributes and their corresponding attribute values for a particular entity. As indicated at block 1022, a partial-to-partial similarity graph is created based upon attribute overlap in the partial-to-attribute graph. As indicated at block 1024, a specific partial corresponding to a first entity in the partial-to-partial similarity graph is identified, the specific partial including a missing or ambiguous attribute for the first entity. As indicated at block 1026, one or more spatially proximate partials to the specific partial from the partial-to-partial similarity graph are identified. As indicated at block 1028, a possible value for the missing or ambiguous attribute for the first entity is identified by identifying, in aggregate across the one or more spatially proximate partials, values associated with the missing or ambiguous attribute.

As can be understood, embodiments of the present invention provide systems, methods, and computer-readable storage media for, among other things, inferring missing attribute values for entities based on partial information about such entities and/or information about other similar entities as extracted from multiple information sources for generating Web ranking signals for online search. Embodiments of the present invention ingest a plurality of heterogeneous input data sources and combine them to produce output data having information content that is more than the sum of its parts. In so doing, conflating partial information about entities from different sources and inferring attribute values based on related entities are addressed as a single problem.

The present invention has been described in relation to particular embodiments, which are intended in all respects to be illustrative rather than restrictive. Alternative embodiments will become apparent to those of ordinary skill in the art to which the present invention pertains without departing from its scope.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the methods 900 of FIG. 9 and 1000 of FIG. 10 is not meant to limit the scope of the present invention in any way and, in fact, the steps may occur in a variety of different sequences within embodiments hereof. Any and all such variations, and any combination thereof, are contemplated to be within the scope of embodiments of the present invention.

What is claimed is:

1. One or more computer-readable storage media storing computer-useable instructions that, when used by one or more computing devices, cause the one or more computing devices to infer entity attribute values, the instructions configured to:
   receive, at a search engine, a search query issued at a user computing device;
   receive, over a web-based computer network and in response to the receiving of the search query, data from multiple heterogeneous data sources, the data including a plurality of entity attribute values each associated with an entity and an attribute, the attribute having an associated attribute type and an attribute confidence score, the heterogeneous data sources corresponding to various sources distributed across the web-based computer network;
   create a partial-to-attribute graph that includes the plurality of entity attribute values and associated entities, a partial being a set of attributes and their corresponding attribute values for a particular entity;
   create a partial-to-partial similarity graph based upon attribute overlap in the partial-to-attribute graph;
   identify a specific partial corresponding to a first entity in the partial-to-partial similarity graph, the specific partial including a missing attribute for the first entity, wherein the missing attribute is not located within any of the heterogeneous data sources;
   based on the attribute overlap in the partial-to-attribute graph, infer a possible value for the missing attribute for the first entity by identifying, in aggregate across one or more spatially proximate partials, values associated with the missing attribute; and
   based at least in part on the inferring of the possible value for the missing attribute and the search query, output for display on the user computing device, a search engine result page that includes the possible value.

2. The one or more computer-readable storage media of claim 1, wherein the data received from multiple heterogeneous data sources is in a common format.

3. The one or more computer-readable storage media of claim 2, wherein the common format is a set of partials.

4. The one or more computer-readable storage media of claim 1, wherein the instructions are further configured to:
   normalize the plurality of entity attribute values across the data received from the multiple heterogeneous data sources;
   compute an authority score for each of the multiple heterogeneous data sources based upon comparisons with a truth set of data on a per attribute-type basis; and
   aggregate the data across the multiple heterogeneous data sources.

5. The one or more computer-readable storage media of claim 1, wherein normalizing the plurality of entity attribute values comprises applying normalization logic that is specific to each attribute type.

6. The one or more computer-readable storage media of claim 1, wherein the instructions are further configured to:
   normalize the attribute confidence scores associated with each attribute; and
   scale the normalized attribute confidence scores in aggregating the data across the multiple heterogeneous data sources.

7. The one or more computer-readable storage media of claim 1, wherein the number of graph connections in the partial-to-attribute graph is reduced by creating one or more composite attributes.

8. The one or more computer-readable storage media of claim 1, wherein inferring the possible value for the missing attribute for the first entity comprises creating a ranked set of possible values for the missing attribute for the first entity based on confidence scores.

9. The one or more computer-readable storage media of claim 1, wherein a first node of the partial-to-attribute graph comprises a partial for an entity, and a second node comprises an entity attribute value, and wherein an edge of the partial-to-attribute graph connects the first node and the second node when an attribute of the entity of the first node corresponds to the attribute value of the second node.

10. A method being performed by one or more computing devices including at least one processor, the method for inferring entity attribute values, the method comprising:
    receiving, at a search engine, a search query;
    receiving data from multiple heterogeneous data sources, the data including a plurality of entity attribute values each associated with an entity and an attribute, the attribute having an associated attribute type and an attribute confidence score;
    normalizing the plurality of entity attribute values across the data received from the multiple heterogeneous data sources;
    computing an authority score for each of the multiple heterogeneous data sources based upon comparisons with a truth set of data on a per attribute-type basis;
    normalizing the attribute confidence scores associated with each attribute;
    scaling the normalized attribute confidence scores;
    aggregating the data across the multiple heterogeneous data sources;
    creating a partial-to-attribute graph that includes the plurality of entity attribute values and associated entities, a partial being a set of attributes and their corresponding attribute values for a particular entity;
    creating a partial-to-partial similarity graph based upon attribute overlap in the partial-to-attribute graph;
    identifying a specific partial corresponding to a first entity in the partial-to-partial similarity graph, the specific partial including a missing attribute for the first entity; and
    inferring a possible value for the missing attribute for the first entity by identifying, in aggregate across one or more spatially proximate partials, values associated with the missing attribute; and
    based at least in part on the search query, output for display result page that includes the possible value.

11. The method of claim 10, wherein the data received from multiple heterogeneous data sources is in a common format.

12. The method of claim 11, wherein the common format is a set of partials.

13. The method of claim 10, wherein normalizing the plurality of entity attribute values comprises applying normalization logic that is specific to each attribute type.

14. The method of claim 10, wherein the number of graph connections in the partial-to-attribute graph is reduced by creating one or more composite attributes.

15. The method of claim 10, wherein inferring the possible value for the missing attribute for the first entity comprises creating a ranked set of possible values for the missing attribute for the first entity based on confidence scores.

16. A system comprising:
an inference engine of a search engine having one or more processors and one or more non-transitory computer-readable storage media;
a data store coupled with the inference engine,
wherein the inference engine:
receives a search query;
receives data from multiple heterogeneous data sources, the data including a plurality of entity attribute values each associated with an entity and an attribute, the attribute having an associated attribute type and an attribute confidence score, the heterogeneous data sources corresponding to various sources distributed across a network;
creates a partial-to-attribute graph that includes the plurality of entity attribute values and associated entities, a partial being a set of attributes and their corresponding attribute values for a particular entity;
creates a partial-to-partial similarity graph based upon attribute overlap in the partial-to-attribute graph;
identifies a specific partial corresponding to a first entity in the partial-to-partial similarity graph, the specific partial including a missing attribute for the first entity the missing attribute is not located within any of the heterogeneous data sources;
infers a possible value for the missing attribute for the first entity by identifying, in aggregate across one or more spatially proximate partials, values associated with the missing attribute;
uses the inferred possible value as a ranking signal for the search query; and based at least in part on the search query, output for display a search engine result page that includes the possible value.

17. The system of claim 16, wherein the inference engine infers the possible value for the missing attribute for the first entity comprises by creating a ranked set of possible values for the missing attribute for the first entity based on confidence scores.

18. The system of claim 16, wherein the inference engine further:
normalizes the plurality of entity attribute values across the data received from the multiple heterogeneous data sources;
computes an authority score for each of the multiple heterogeneous data sources based upon comparisons with a truth set of data on a per attribute-type basis; and
aggregates the data across the multiple heterogeneous data sources.

19. The system of claim 16, wherein the inference engine further:
normalizes the attribute confidence scores associated with each attribute; and
scales the normalized attribute confidence scores in aggregating the data across the multiple heterogeneous data sources.

20. The system of claim 16, wherein the number of graph connections in the partial-to-attribute graph is reduced by creating one or more composite attributes.

* * * * *